(12) United States Patent
Floren et al.

(10) Patent No.: US 8,840,508 B2
(45) Date of Patent: Sep. 23, 2014

(54) PRESSURE OIL LUBRICATION OF THE GEAR WHEELS OF A PLANETARY GEAR SET

(75) Inventors: Ansgar Floren, Hagen (DE); Gerhard Bauer, Witten (DE); Dirk Strasser, Breckerfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/213,425

(22) Filed: Aug. 19, 2011

(65) Prior Publication Data
US 2012/0046139 A1 Feb. 23, 2012

(30) Foreign Application Priority Data

Aug. 19, 2010 (DE) .......................... 10 2010 034 750
Feb. 19, 2011 (DE) .......................... 10 2011 011 796
Jun. 9, 2011 (DE) .......................... 10 2011 103 725

(51) Int. Cl.
*F16H 57/04* (2010.01)
(52) U.S. Cl.
CPC ........ *F16H 57/0486* (2013.01); *F16H 57/0456* (2013.01); *F16H 57/0479* (2013.01)
USPC .......................................... 475/159; 184/6.12
(58) Field of Classification Search
USPC ...................... 475/159; 74/467, 468; 184/6.12
See application file for complete search history.

(56) References Cited

U.S. PATENT DOCUMENTS 1,563,741 A * 12/1925 Good ............................ 475/108
4,157,668 A * 6/1979 Fukuma et al. ............... 475/159
4,271,928 A 6/1981 Northern
4,573,373 A * 3/1986 Shimizu et al. .................. 74/468
5,976,048 A * 11/1999 Sudau et al. ................... 475/159
6,039,667 A * 3/2000 Schunck et al. ............... 475/159
7,963,186 B2 * 6/2011 Hayes et al. ..................... 74/467
8,267,826 B2 * 9/2012 Duong et al. .................. 475/159

FOREIGN PATENT DOCUMENTS

| DE | 1 226 383 | 10/1966 |
| DE | 7216863 U | 3/1973 |
| DE | 102 60 132 | 7/2004 |
| EP | 0 164 968 A1 | 12/1985 |
| EP | 1 717 489 A2 | 11/2006 |
| EP | 1 876 338 A2 | 1/2008 |
| JP | 2005163666 | 6/2005 |

* cited by examiner

*Primary Examiner* — Michael Mansen
*Assistant Examiner* — Stacey Fluhart
(74) *Attorney, Agent, or Firm* — Maginot, Moore & Beck

(57) ABSTRACT

A planetary gear set with a planet stage revolving in a gear set housing has a planet carrier which is connected in particular to a rotor and has planet web cheeks which are connected to one another by means of webs, and a plurality of planet gears which are mounted in planet gear bearings, which are connected to the planet carrier, and are in engagement on one side with a sun gear and on the other side with a ring gear. The gear set housing is provided with an oil supply channel which is connected to at least one oil-guiding channel in the planet carrier. The lubrication of the meshing engagements is facilitated in the planetary gear set by providing dry sump lubrication. This is achieved in that at least one channel connected to the oil-guiding channel is embedded in each web, said channel being aligned with the meshing engagements between sun gear and planet gear and/or planet gear and ring gear.

9 Claims, 3 Drawing Sheets

PRESSURE OIL LUBRICATION OF THE GEAR WHEELS OF A PLANETARY GEAR SET

This application claims priority under 35 U.S.C. §119 to German patent application no. DE 10 2010 034 750.7, filed Aug. 19, 2010 in Germany, the disclosure of which is incorporated herein by reference in its entirety. In addition, this application further claims priority under 35 U.S.C. 119 to (i) German patent application no. DE 10 2011 011 796.2, filed Feb. 19, 2011 in Germany, and (ii) German patent application no. DE 10 2011 103 725.3, filed Jun. 9, 2011 in Germany.

BACKGROUND

The disclosure relates to a planetary gear set with a planet stage revolving in a gear set housing, having a planet carrier which is connected in particular to a rotor and has planet web cheeks which are connected to one another by means of webs, and a plurality of planet gears which are mounted in planet gear bearings, which are connected to the planet carrier, and are in engagement on one side with a sun gear and on the other side with a ring gear, wherein, furthermore, the gear set housing is provided with an oil supply channel which is connected to at least one oil-guiding channel in the planet carrier.

A planetary gear set of this type is known from DE 102 60 132 A1. This planetary gear set is designed for a wind power plant and has an inserted ring, which is penetrated by an oil-guiding channel, in the gear set housing. The oil-guiding channel of the inserted ring is connected to a plurality of oil-guiding channels guided through one of the side cheeks of the planet carrier. Said oil-guiding channels are guided to the axles of the planet gears and are connected to the planet gear bearings for lubrication of same. The meshing engagements of said planetary gear set are lubricated by oil sump lubrication.

A similar planetary gear set is known from JP 200 516 36 66 A. This planetary gear set also has pressure oil lubrication of the planet gear bearings.

DE 12 26 383 B discloses a planetary gear set which has an oil sump, wherein, in that region of the gear set housing in which a planet gear passing therethrough enters an oil sump, positionally fixed, lateral coverings are arranged next to the meshing engagement with the ring gear, one of which coverings is provided with an opening. A pipeline which can be shut off by a nonreturn valve is connected to said opening, the pipeline having lubricant conveying lines branching off therefrom to the lubricating points of the gear set. One of said lubricant conveying lines leads to a spray nozzle. This planetary gear set also has oil sump lubrication of the various meshing engagements.

SUMMARY

The disclosure is based on the object of improving the lubrication of the meshing engagements in a planetary gear set.

This object is achieved in that at least one channel connected to the oil-guiding channel is embedded in each web, said channel being aligned with regions of the meshing engagements of the planet gears with the sun gear and/or the planet gears with the ring gear. In this context, the alignment with regions means centrally to the respective meshing engagement or to a zone upstream or downstream of the meshing engagement. This lubricating system is firstly independent of the lubricating system for the planet gear bearing, but may be supplied with oil by a common lubricant pump and also a common oil-guiding channel. This lubricating system furthermore constitutes a reversal of the known oil sump lubricating technology and therefore makes it possible to use dry sump lubrication in the planetary gear set. As a separate lubricating oil pump and supply line are not required for the lubrication of the meshing engagements, the solution according to the disclosure can also be used cost-effectively.

In a development of the disclosure, a nozzle body is inserted into the channel. Said nozzle body is provided for the targeted supply of oil upstream or else downstream of the meshing engagement of the corresponding pairs of teeth.

In a further refinement of the disclosure, the nozzle body has a connecting element to which a nozzle part and a nozzle component are fastened. The nozzle part and the nozzle component are provided with at least one bore each through which the oil emerges in order to lubricate the particular meshing engagement. The channel and, consequently, the nozzle body with the nozzle part and the nozzle component are embedded and aligned in the web in such a manner that the nozzle part is aligned with the meshing engagement of a planet gear and the sun gear. By contrast, the nozzle component is aligned with the meshing engagement of a planet gear and the ring gear. Two different meshing engagements are therefore lubricated with a single nozzle body. Each planet gear here is assigned at least one nozzle body.

In a development of the disclosure, the nozzle part is of cylindrical design and has a nozzle part bore which is aligned with a region of the meshing engagement between planet gear and sun gear. In a corresponding refinement, the nozzle component has a nozzle component bore which is aligned with a region of the meshing engagement between the planet gear and ring gear.

In a development of the disclosure, the nozzle component is of conical or cylindrical design and has an external thread. For installation, the nozzle body is inserted into a channel and the nozzle component is screwed by the external thread into a corresponding internal thread which is incorporated into the end side of the channel. For this purpose, a slot or the like for the fitting of a screw-in tool is embedded next to the nozzle component bore. The nozzle component or the external thread is designed in such a manner that complete oil-tightness with respect to the channel is produced. As an alternative, it is conceivable to provide an approximate oil-tightness. In a further refinement, provision is made for the nozzle part to be inserted in an at least approximately oil-tight manner into the channel. For this purpose, the nozzle part is of cylindrical design corresponding to the channel diameter and is dimensioned in such a manner that, while being easily fittable, the approximate or complete oil-tightness in relation to the channel is produced.

In a development of the disclosure, the connecting part is calked to the nozzle part and/or the nozzle component. This results in the production of a form-fitting connection of the components, which completely satisfies the demands made. This connection is readily appropriate in particular if complete oil-tightness is not required.

In a further refinement of the disclosure, the connecting part is adhesively bonded to the nozzle part and/or the nozzle component. This connection also meets the demands made. It is also provided within the context of the disclosure both to calk and also additionally to adhesively bond the connecting part to the nozzle part and/or to the nozzle component. By means of this combination of the connections, an oil-tight configuration of the connection can easily be produced. An example of a suitable adhesive is Loctite 603.

In an advantageous development of the disclosure, at least one end-side blind bore is embedded in the connecting part. A blind bore of this type facilitates the calking operation which can basically be carried out by fitting a suitable tool, for example a chisel, between the components and subsequently driving in calking by, for example, an impact action on the chisel. If a blind bore is present, the connecting part preferably protrudes slightly over a receiving opening in the nozzle part and/or the nozzle component, and the protruding part of the connecting part can be widened, for example, by a tapered mandrel and can be calked or clamped to the nozzle part and/or the nozzle component. In order to ensure a defined slip-on extent of the nozzle part and/or of the nozzle component onto the connecting part, the connecting part is provided with a recess which has a depth which corresponds to the envisaged slip-on extent. Of course, however, other connection configurations between the connecting part and the nozzle part and/or the nozzle component, for example welding or soldering, are also conceivable within the context of the disclosure.

In a development of the disclosure, two or more channels which are connected to the oil-guiding channel via a connecting channel are embedded in the web. The connecting channel here is arranged in such a manner that it opens out into the particular channel in the region of the connecting element of the nozzle body. The connecting element has a smaller diameter than the nozzle part and the nozzle component, and therefore the oil in the channel is guided to the nozzle part and the nozzle component in a manner flowing around the connecting element.

In a further refinement of the disclosure, the channels of different webs are arranged in the web at different locations based on the particular tooth width. As a result, with two channels per web and with a planetary gear set having three planet gears and correspondingly three webs, six different nozzle positions are produced over the tooth width. This ensures uniform lubrication of the meshing engagements. Of course, however, the planetary gear set may also have more than three planet gears and a corresponding number of webs. Provision is also made for more than two channels to be embedded in each web.

BRIEF DESCRIPTION OF THE DRAWINGS

Further advantageous refinements of the disclosure can be gathered from the description of the drawings, in which an exemplary embodiment which is illustrated in the figures is described in more detail.

In the figures.

DETAILED DESCRIPTION

Figure 1:
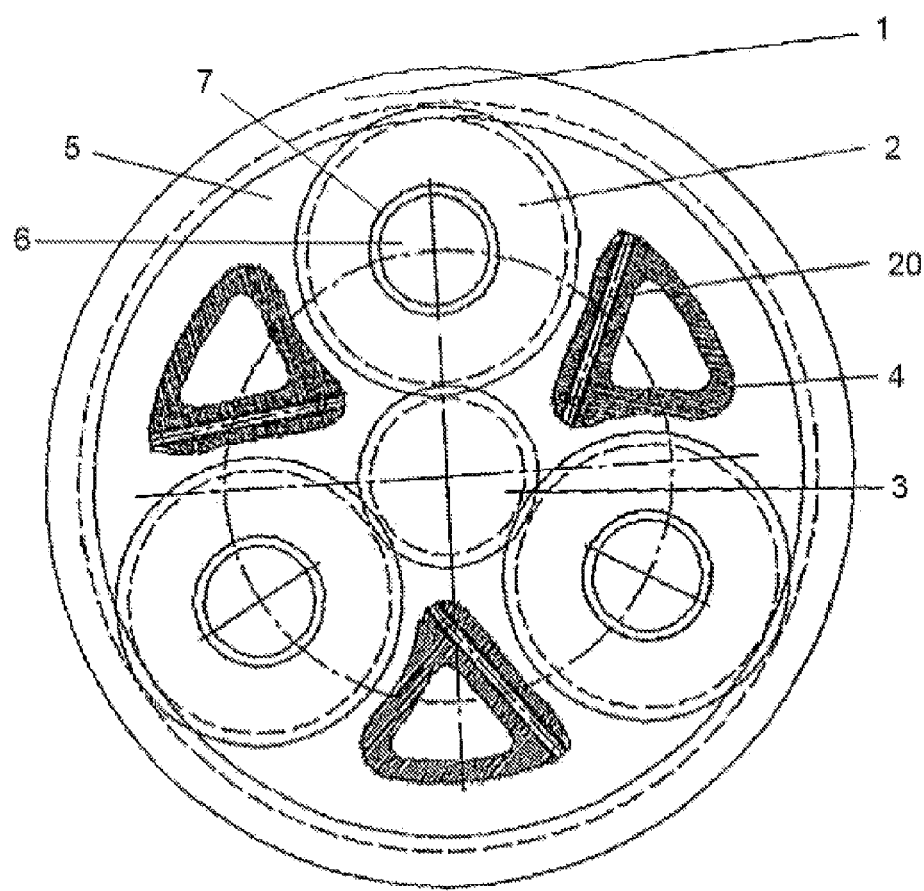
FIG. 1 shows a section through a planet stage of a planetary gear set.

The section illustrated in FIG. 1 through a planet stage of a planetary gear set shows a ring gear 1, three planet gears 2 and a sun gear 3, which are in meshing engagement with one another by each planet gear 2 being in meshing engagement in a known manner both with the ring gear 1 and with the sun gear 3. The planet gears 2 are arranged and mounted in a planet carrier, wherein the planet carrier has two lateral planet web cheeks 5 (only one of which is visible in FIG. 1) which are connected to each other via webs 4. The webs 4 at least partially fill the region between the individual planet gears 2. Furthermore, axles 6 having planet gear bearings 7, which are likewise connected to the planet web cheeks 5, are guided through the planet gears 2. The entire planetary gear set is fitted in a gear set housing (not shown). The planetary gear set constructed in this manner is designed, for example, as a generator gearing for wind power plants. In this case, the planet carrier can then be connected to the rotor of the wind power plant. The planet carrier may in general also be a non-rotating component. The planet carrier may also be arranged in the interior of a multi-stage gearing. One example is a differential gearing having two rotating and one stationary planet carrier.

Channels 20 which completely penetrate the webs 4 and are aligned with respect to a meshing engagement between a planet gear 2 and the sun gear 3 and also with the toothed ring of the ring gear 1 are embedded in, for example bored into, each web 4.

Figure 2:
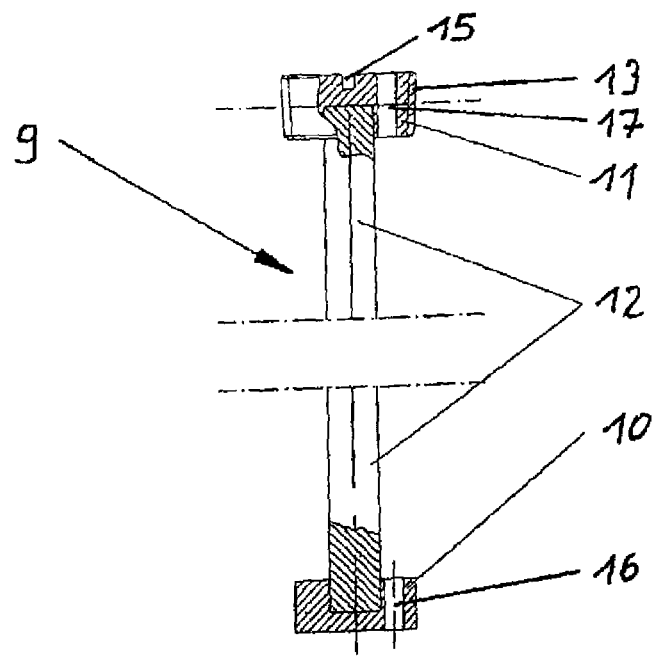
FIG. 2 shows a section through a nozzle body according to the disclosure.
Figure 3:
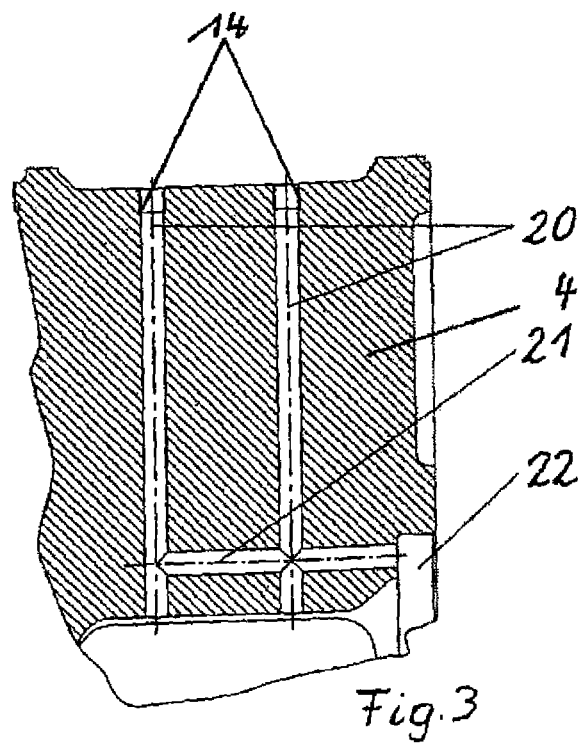
FIG. 3 shows a section through a web which connects two planet web cheeks and has two embedded channels.
Figure 4:
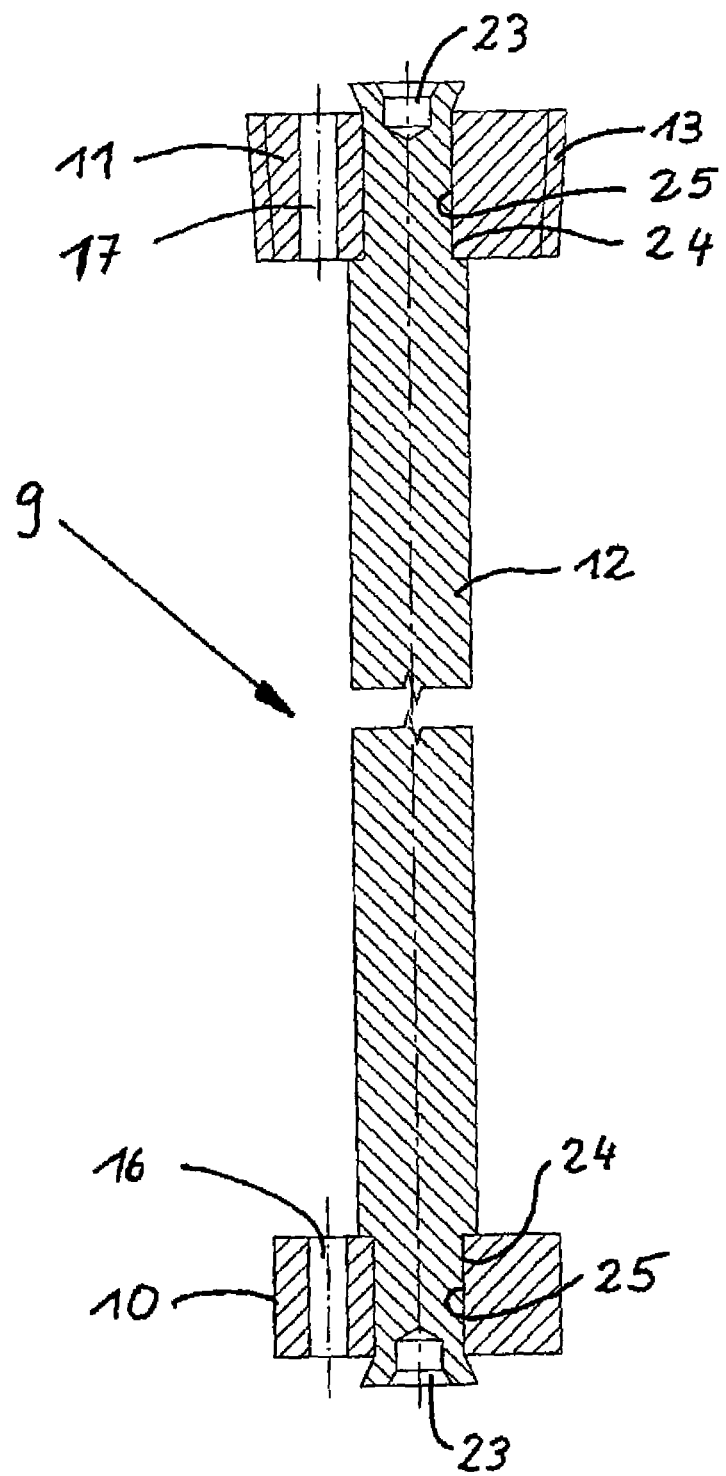
FIG. 4 shows a section through a further nozzle body according to the disclosure.

A nozzle body 9 illustrated in FIG. 2 or FIG. 4 is inserted into each of said channels 20. The nozzle body 9 has a connecting element 12 to which a nozzle part 10 and a nozzle component 11 are fastened, one at each end. The connecting part 12 and the nozzle part 10 and also the nozzle component 11 can be manufactured from a metallic material and accordingly can connect the components to one another by soldering or welding. The nozzle part 10 is of cylindrical design and has a diameter which corresponds at least approximately to the inside diameter of the channel 20. As a result, while being easily fittable, an at least approximately complete oil-tightness is provided at the corresponding connecting point. The nozzle component 11 is of slightly conical design and has an external thread 13. Said external thread 13 corresponds in a sealing manner to an internal thread 14 which is incorporated into the end side of each channel 20 (FIG. 3). Furthermore, the nozzle component 11 has a slot 15 for the fitting of a screw-in tool.

Both the nozzle part 10 and the nozzle component 11 have a nozzle part bore 16 and a nozzle component bore 17. Each of said bores is provided such that it is arranged outside the outer circumference of the connecting element 12.

The web 4 illustrated in FIG. 3 has two channels 20, into each of which a nozzle body 9 is inserted or screwed. The nozzle body 20 extends through the entire channel 20 in each case, and the nozzle component 11 ends flush with the upper, free end of the web 4 and the nozzle part 10 with the lower, free end of the web.

The channels 20 are connected to each other via a connecting channel 21, wherein the connecting channel 21 is furthermore connected to an oil-guiding channel 22. The connecting channel 21 interacts with the channels 20 in the region of the connecting element 12 such that oil which is supplied passes along the connecting element 12 to the nozzle part 10 and to the nozzle component 11 and is sprayed through the nozzle part bore and the nozzle component bore. The oil-guiding channel 22 is optionally connected via further connections to a lubricating oil pump for conveying the oil.

The channels 20 are embedded at a distance from each other in the web 4, wherein, in different webs 4 (see FIG. 1), the channels are each aligned at different locations based on the tooth width of the pair of teeth which are injection molded on. Therefore, with two channels 20 per web 4, six different nozzle positions are produced over the tooth width.

FIG. 4, like FIG. 2, shows a nozzle body 9 which has a connecting element 12 to which a nozzle part 10 and a nozzle component 11 are fastened, one at each end side. In contrast to FIG. 2, the connecting part 12 here is calked to the nozzle part 10 and the nozzle component 11. This results in the production of a form-fitting connection of the components.

In order to simplify the calking operation, end-side blind bores 23 are embedded in the connecting part 12, and the connecting part 12 protrudes slightly over receiving openings 25 in the nozzle part 10 and the nozzle component 11, and the protruding part of the connecting part 12 can be widened, for example, by a tapered mandrel and calked to the nozzle part and/or the nozzle component. In order to ensure a defined slip-on extent of the nozzle part 10 and of the nozzle component 11 onto the connecting part 12, the connecting part is provided with end-side recesses 24 which have a depth which corresponds to the envisaged slip-on extent.

LIST OF REFERENCE NUMBERS

1 Ring gear
2 Planet gear
3 Sun gear
4 Web
9 Nozzle body
10 Nozzle part
11 Nozzle component
12 Connecting element
13 External thread
14 Internal thread
15 Slot
16 Nozzle part bore
17 Nozzle component bore
20 Channel
21 Connecting channel
22 Oil-guiding channel
23 Blind bore
24 Recess
25 Receiving opening

What is claimed is:

1. A planetary gear set comprising:
   a gear set housing having a planet carrier which is connected to a rotor and has planet web cheeks which are connected to one another by webs, and
   a plurality of planet gears operably mounted in the gear set housing on axles with planet gear bearings, the axles extending between the web cheeks of the planet carrier, each of the planet gears being positioned in engagement on one side with a sun gear and on the other side with a ring gear,
   wherein each of the webs includes an oil-guiding channel that is configured to receive oil, and
   wherein each of the webs includes at least one channel having an inlet connected to the associated oil-guiding channel of the web to receive oil therefrom, said at least one channel of each web including a first outlet end portion positioned to direct oil received from the oil-guiding channel onto a region of meshing engagement between the sun gear and the planet gears and a second outlet end portion positioned to direct oil received from the oil-guiding channel onto a region of meshing engagement between the planet gears and the ring gear, and
   further comprising a nozzle body inserted into the at least one channel of each of the webs,
   wherein the nozzle body has a connecting element to which a nozzle part and a nozzle component are fastened,
   wherein the nozzle part is arranged in the first end portion of the at least one channel and the nozzle component is arranged in the second end portion of the at least one channel, and
   wherein the nozzle part and/or the nozzle component are/is inserted into the at least one channel in an at least approximately oil-tight manner.

2. The planetary gear set according to claim 1, wherein the nozzle part is of cylindrical configuration and has a nozzle part bore which is aligned with the region of engagement between the planet gears and the sun gear.

3. The planetary gear set according to claim 1, wherein the nozzle component has a nozzle component bore which is aligned with the region of engagement between the planet gears and the ring gear.

4. The planetary gear set according to claim 1, wherein the connecting element is adhesively bonded to the nozzle part and/or to the nozzle component.

5. The planetary gear set according to claim 1, wherein the at least one channel includes two or more channels, each of the two or more channels including a first end portion positioned to direct oil onto a region of meshing engagement between the sun gear and the planet gears and a second open end portion positioned to direct oil onto a region of meshing engagement between the planet gears and the ring gear, and
   wherein the two or more channels of each of the webs are connected via a connecting channel in the web that is in turn connected to the associated oil-guiding channel.

6. The planetary gear set according to claim 1, wherein the at least one channel of different webs are arranged in the web at different locations based on a tooth width of the planet gears, the sun gear, and the ring gear.

7. A planetary gear set comprising:
   a gear set housing having a planet carrier which is connected to a rotor and has planet web cheeks which are connected to one another by webs, and
   a plurality of planet gears operably mounted in the gear set housing on axles with planet gear bearings, the axles extending between the web cheeks of the planet carrier, each of the planet gears being positioned in engagement on one side with a sun gear and on the other side with a ring gear,
   wherein each of the webs includes an oil-guiding channel that is configured to receive oil, and
   wherein each of the webs includes at least one channel having an inlet connected to the associated oil-guiding channel of the web to receive oil therefrom, said at least one channel of each web including a first outlet end portion positioned to direct oil received from the oil-guiding channel onto a region of meshing engagement between the sun gear and the planet gears and a second outlet end portion positioned to direct oil received from the oil-guiding channel onto a region of meshing engagement between the planet gears and the ring gear, and
   further comprising a nozzle body inserted into the at least one channel of each of the webs,
   wherein the nozzle body has a connecting element to which a nozzle part and a nozzle component are fastened,
   wherein the nozzle part is arranged in the first end portion of the at least one channel and the nozzle component is arranged in the second end portion of the at least one channel, and
   wherein the connecting element is calked to the nozzle part and/or to the nozzle component.

8. The planetary gear set according to claim 7, wherein at least one end-side axial blind bore is embedded in the connecting element.

9. A planetary gear set comprising:

a gear set housing having a planet carrier which is connected to a rotor and has planet web cheeks which are connected to one another by webs, and a plurality of planet gears operably mounted in the gear set housing on axles with planet gear bearings, the axles extending between the web cheeks of the planet carrier, each of the planet gears being positioned in engagement on one side with a sun gear and on the other side with a ring gear, wherein each of the webs includes an oil-guiding channel that is configured to receive oil, and wherein each of the webs includes at least one channel having an inlet connected to the associated oil-guiding channel of the web to receive oil therefrom, said at least one channel of each web including a first outlet end portion positioned to direct oil received from the oil-guiding channel onto a region of meshing engagement between the sun gear and the planet gears and a second outlet end portion positioned to direct oil received from the oil-guiding channel onto a region of meshing engagement between the planet gears and the ring gear, and further comprising a nozzle body inserted into the at least one channel of each of the webs, wherein the nozzle body has a connecting element to which a nozzle part and a nozzle component are fastened, wherein the nozzle part is arranged in the first end portion of the at least one channel and the nozzle component is arranged in the second end portion of the at least one channel, wherein the nozzle component has a nozzle component bore which is aligned with the region of engagement between the planet gears and the ring gear, and wherein the nozzle component, which is of conical or cylindrical configuration, has an external thread.

\* \* \* \* \*